(12) United States Patent
Huang

(10) Patent No.: US 8,009,143 B2
(45) Date of Patent: Aug. 30, 2011

(54) TABLET PC AND METHOD FOR KEYBOARD CONTAINING THE SAME

(75) Inventor: Chih Pen Huang, Taipei (TW)

(73) Assignee: Flextronics Computing Mauritius Ltd., Ebene (MU)

(*) Notice: Subject to any disclaimer, the term of this patent is extended or adjusted under 35 U.S.C. 154(b) by 1102 days.

(21) Appl. No.: 11/543,379

(22) Filed: Oct. 4, 2006

(65) Prior Publication Data

US 2008/0084396 A1    Apr. 10, 2008

(51) Int. Cl.
*G09G 5/00* (2006.01)

(52) U.S. Cl. .............. 345/168; 345/169; 361/679.08

(58) Field of Classification Search .......... 345/156–179; 361/679.08, 679.09, 679.11, 679.17; 400/472, 400/714

See application file for complete search history.

(56) References Cited

U.S. PATENT DOCUMENTS

| | | | | |
|---|---|---|---|---|
| 5,241,303 A * | 8/1993 | Register et al. | ............... | 345/168 |
| 5,551,497 A * | 9/1996 | Stanley | ......................... | 400/714 |
| 6,700,774 B2 * | 3/2004 | Chien et al. | ................ | 361/679.2 |
| 7,126,588 B2 * | 10/2006 | Oakley | ........................... | 345/169 |
| 7,505,252 B2 * | 3/2009 | Ma | .................................. | 345/168 |
| 7,663,602 B2 * | 2/2010 | Jones et al. | .................. | 345/168 |
| 2002/0186206 A1 * | 12/2002 | Lee et al. | ...................... | 345/168 |
| 2004/0056843 A1 * | 3/2004 | Lin et al. | ....................... | 345/168 |
| 2004/0095326 A1 * | 5/2004 | Anderson | ...................... | 345/168 |

FOREIGN PATENT DOCUMENTS

TW    581299    3/2004

* cited by examiner

*Primary Examiner* — Regina Liang
(74) *Attorney, Agent, or Firm* — Per H. Larsen; Robert G. Crouch; Marsh Fischmann & Breyfogle LLP

(57) ABSTRACT

A tablet computer is provided. The tablet computer includes: an electronic computing base having receiving portion; a liquid crystal display pivotally connected to the electronic computing base; a keyboard detached contained in the receiving portion and wirelessly communicating with the electronic computing base; a container disposed on the receiving portion; and a cover mounted on the receiving portion and pivotally connected to the electronic computing base.

15 Claims, 9 Drawing Sheets

TABLET PC AND METHOD FOR KEYBOARD CONTAINING THE SAME

FIELD OF THE INVENTION

The present invention relates to a computer, in particular, to the tablet computer and method for keyboard containing the same.

BACKGROUND OF THE INVENTION

An ordinary notebook is widely-accepted defined as follows: the appearance thereof is slate-shaped and usually the dimension thereof is smaller than that of the notebook but is larger than that of the handheld computer (e.g. PDA), which is classified as one type of the portable computers. The tablet computer is equipped with the liquid crystal touch screen or the digitizing tablet, so as to enable users to dominate the tablet computer by the stylus or the digital pen instead of a keyboard or a mouse. What are highlighted to the tablet computer are the diverse superiorities thereof, including the portability induced by the extremely lightweight thereof and the practice convenience for users while using the tablet computer brought along with the handwriting-able data input/computer-operating manner. Hence, the tablet computer has been always regarded as the quite competitive product among the next generation computer products.

However, for majority of users, it is convenience to input data through the handwriting-able manner, but for more occasions, if users can input data whereby the keyboard and the stylus are jointly involved and cooperated, the more practice conveniences is realized. Nevertheless for the tablet computer, there usually exists the contradiction between the handwriting-able operating manner and the keyboard-inputting manner.

Since typically the keyboard disposed on the tablet computer is inseparable from the tablet computer itself, when the posture of the tablet computer is altered in order to seek a suitable position so as to facilitate users to input data by the handwriting-able manner, however this posture might be inadequate for inputting data using the keyboard. The indicated drawback is simply concluded by inspecting the ordinary tablet computer. Moreover, when the tablet computer is being in the handwriting-able status, the liquid crystal touch screen is usually set up with a particular angle or posture, so as to maintain the user's demands. In this respect a valuable issue is raised therefrom regarding how to rigidly place the tablet computer while being under a compound or a complex operation status.

To overcome the aforementioned drawbacks of the prior art, a novel device for measuring flow and the method manufacturing the novel device thereof is provided.

SUMMARY OF THE INVENTION

According to the aforementioned present invention, a tablet computer is provided. The tablet computer includes: an electronic computing base having receiving portion; a liquid crystal display pivotally connected to the electronic computing base; a keyboard detached contained in the receiving portion and wirelessly communicating with the electronic computing base; a container disposed on the receiving portion; and a cover mounted on the receiving portion and pivotally connected to the electronic computing base.

Preferably, the tablet computer further includes a pivot, wherein the display is pivotally connected to the electronic computing base by the pivot.

Preferably, the electronic computing base is supported by the cover.

Preferably, the keyboard is fixed in the container by the cover.

Preferably, the cover is hollow-shaped.

Preferably, the cover has a rim being one of a metal rim and a plastic rim.

Preferably, the pivot is one of a multi-stage adjustable pivot and an adjustable pivot.

According to the aforementioned present invention, a portable computer is provided. The portable computer includes: an electronic computing device having a first side and a second side opposite to the first side and a display device mounted on the first side; a container disposed on the second side; a input unit detachedly contained in the container wirelessly communicating with the electronic computing device; and a cover mounted on the container pivotally connected to the second side.

Preferably, the display is pivotally connected to the electronic computing device by a pivot.

According to the aforementioned present invention, a tablet computer is provided. The tablet computer includes: a body having a receiving portion and a computing device; and a cover pivotally connected to the body by the pivot to cover the receiving portion.

Preferably, the tablet computer further includes a keyboard detachedly contained in the receiving portion and wirelessly communicating with the computing device.

Preferably, the tablet computer further includes a liquid crystal display pivotally connected to the body by a pivot.

According to the aforementioned present invention, a keyboard assembling method for assembling a keyboard into a container of a tablet computer is provided. The method includes steps of: disposing the container on the tablet computer; placing the keyboard in the container; and fixing the keyboard in the container.

Preferably, the keyboard assembling method further includes steps of: releasing the fixation for the keyboard; and removing the keyboard from the container.

Preferably, the keyboard wirelessly communicates with the tablet computer.

The foregoing and other features and advantages of the present invention will be more clearly understood through the following descriptions with reference to the drawings:

BRIEF DESCRIPTION OF THE DRAWINGS

FIG. 1(*b*) is the second schematic diagram illustrating the present invented tablet computer;

FIG. 1(*c*) is the schematic diagram illustrating the tablet computer entering the cooperation status the keyboard and the stylus are involved;

FIG. 1(*d*) is the schematic diagram illustrating the tablet computer being in the cooperation status the keyboard and the stylus are involved;

FIG. 1(*e*) is a schematic diagram illustrating the containing process (A) for the invented tablet computer;

FIG. 1(*f*) is a schematic diagram illustrating the containing process (B) for the invented tablet computer;

FIG. 1(*g*) is a schematic diagram illustrating the contained keyboard for the invented tablet computer;

FIG. 1(*h*) is the schematic diagram illustrating the tablet computer being in the status the stylus is solely involved; and FIG. 1(*i*) is the schematic diagram illustrating the tablet computer being in the status the keyboard is solely involved.

DETAILED DESCRIPTION OF THE PREFERRED EMBODIMENT

The present invention will now be described more specifically with reference to the following embodiments. It is to be noted that the following descriptions of preferred embodiments of this invention are presented herein for the aspect of illustration and description only; it is not intended to be exhaustive or to be limited to the precise form disclosed.

Figure 1A:
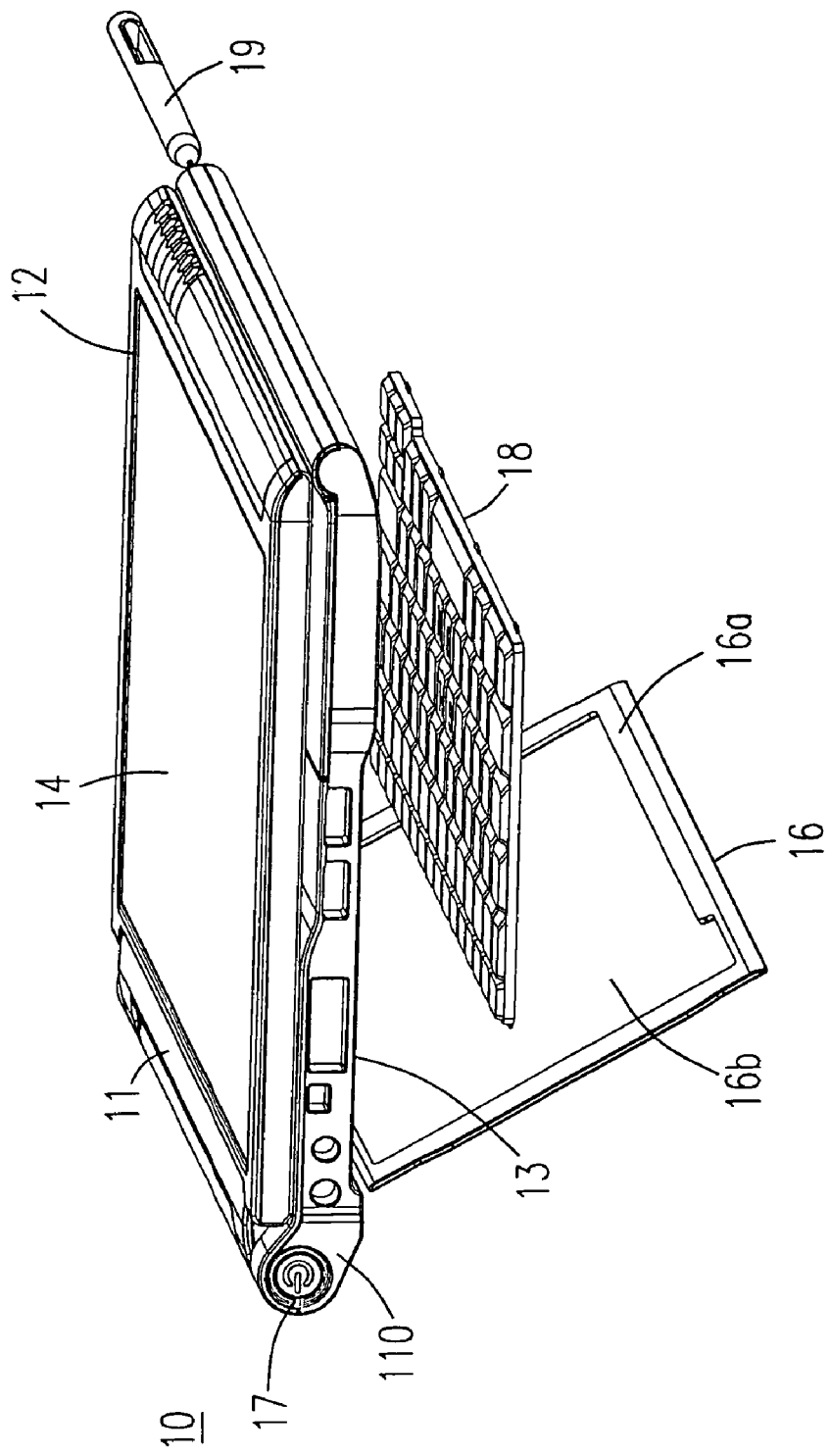
FIG. 1(*a*) is the first schematic diagram illustrating the present invented tablet computer.
Figure 1B:
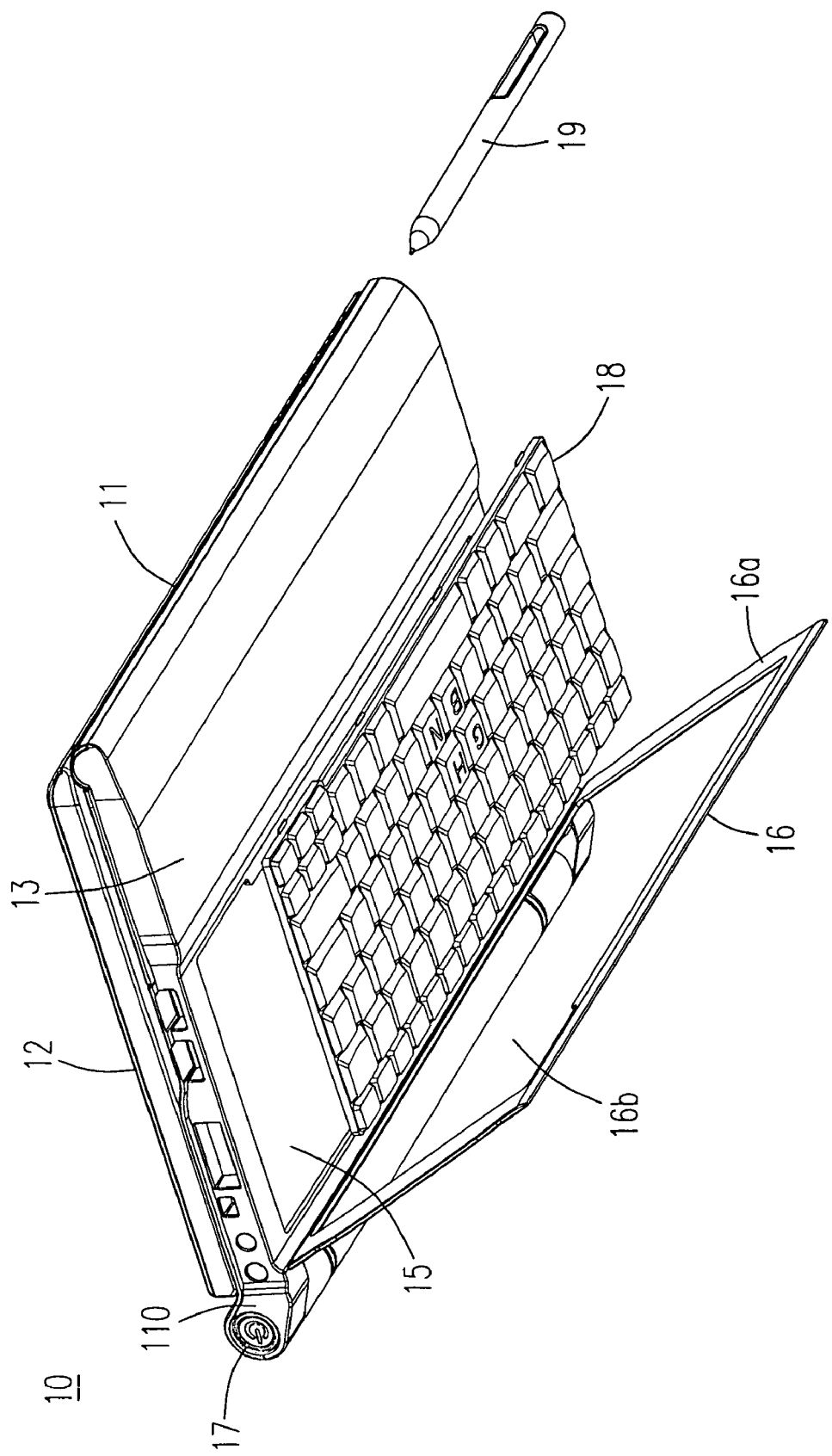
Figure 1C:
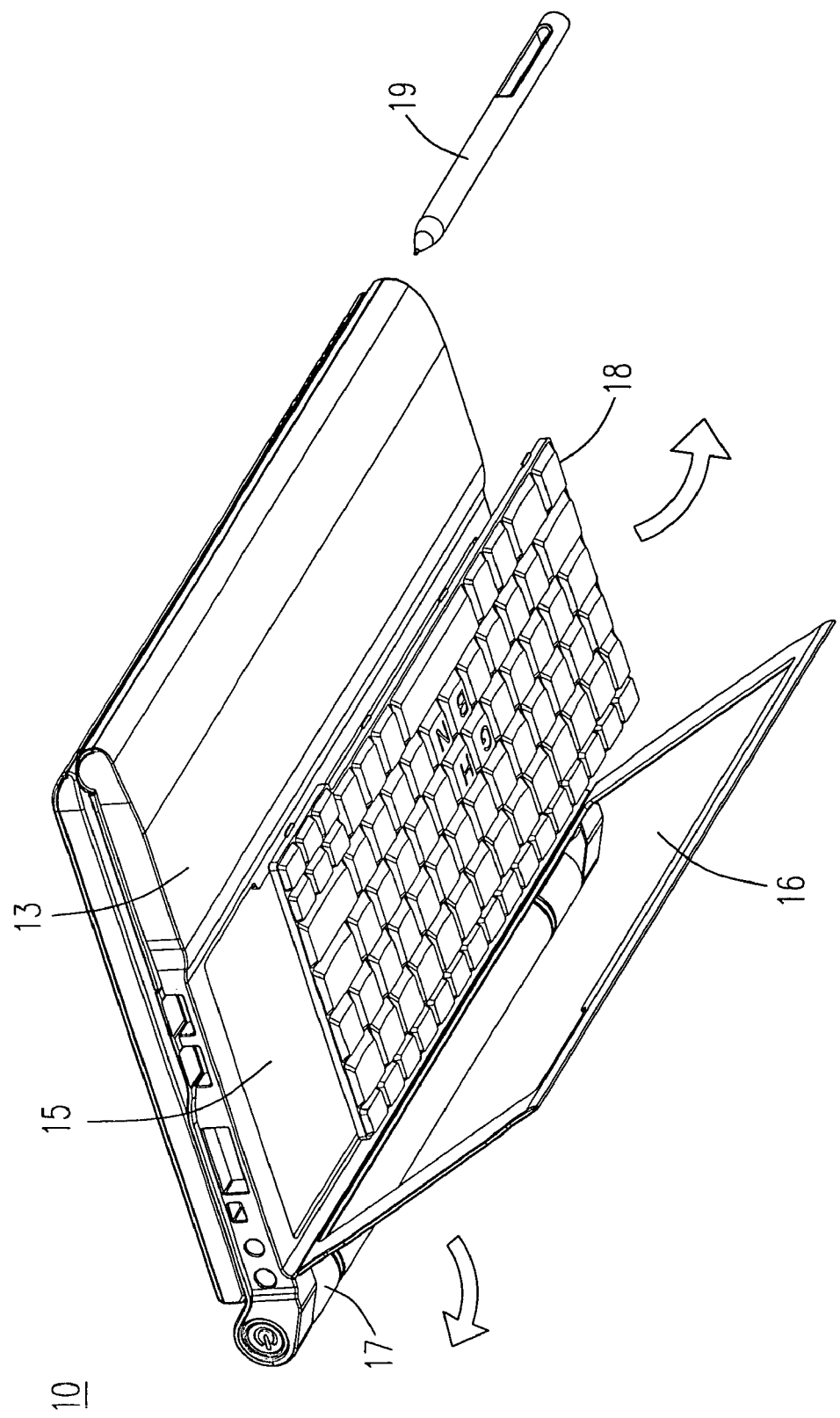
Figure 1D:
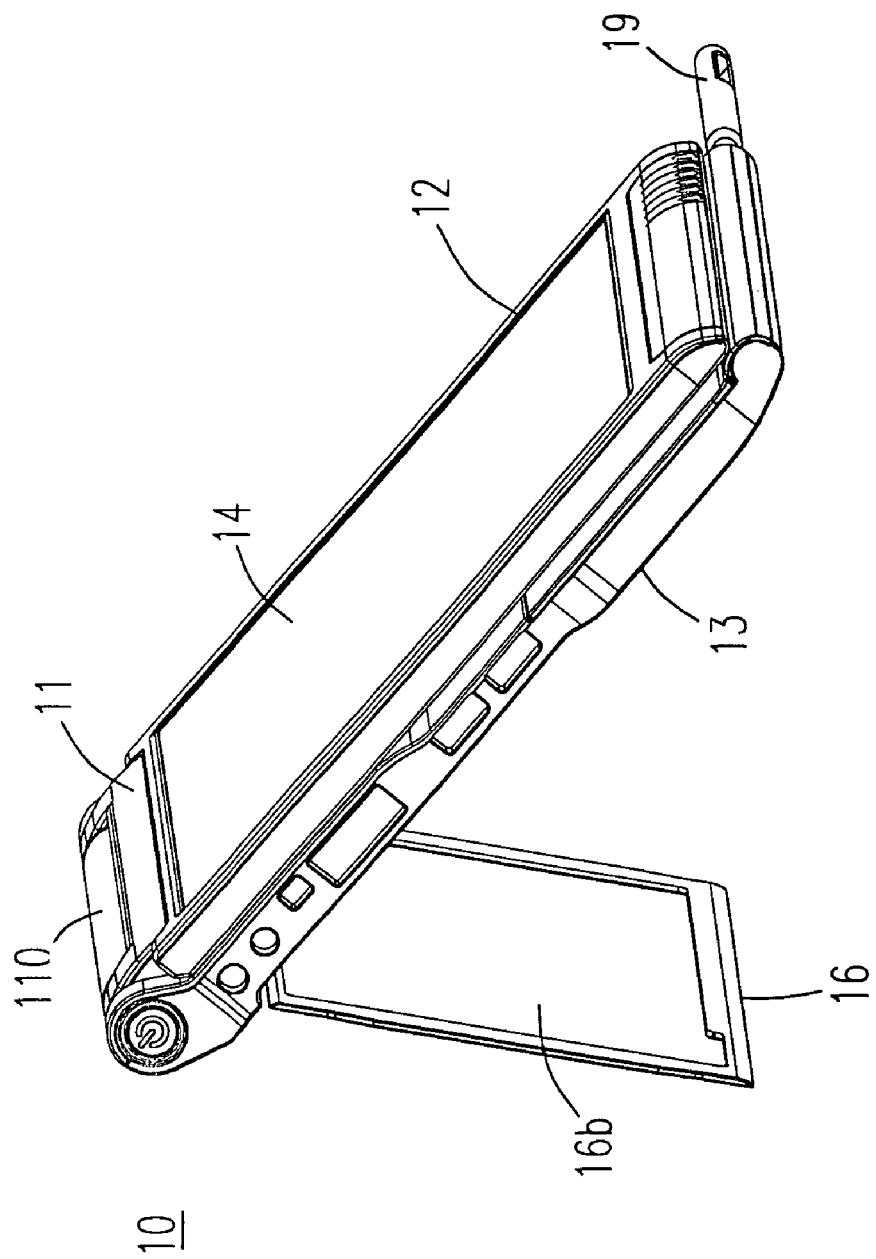
Figure 1E:
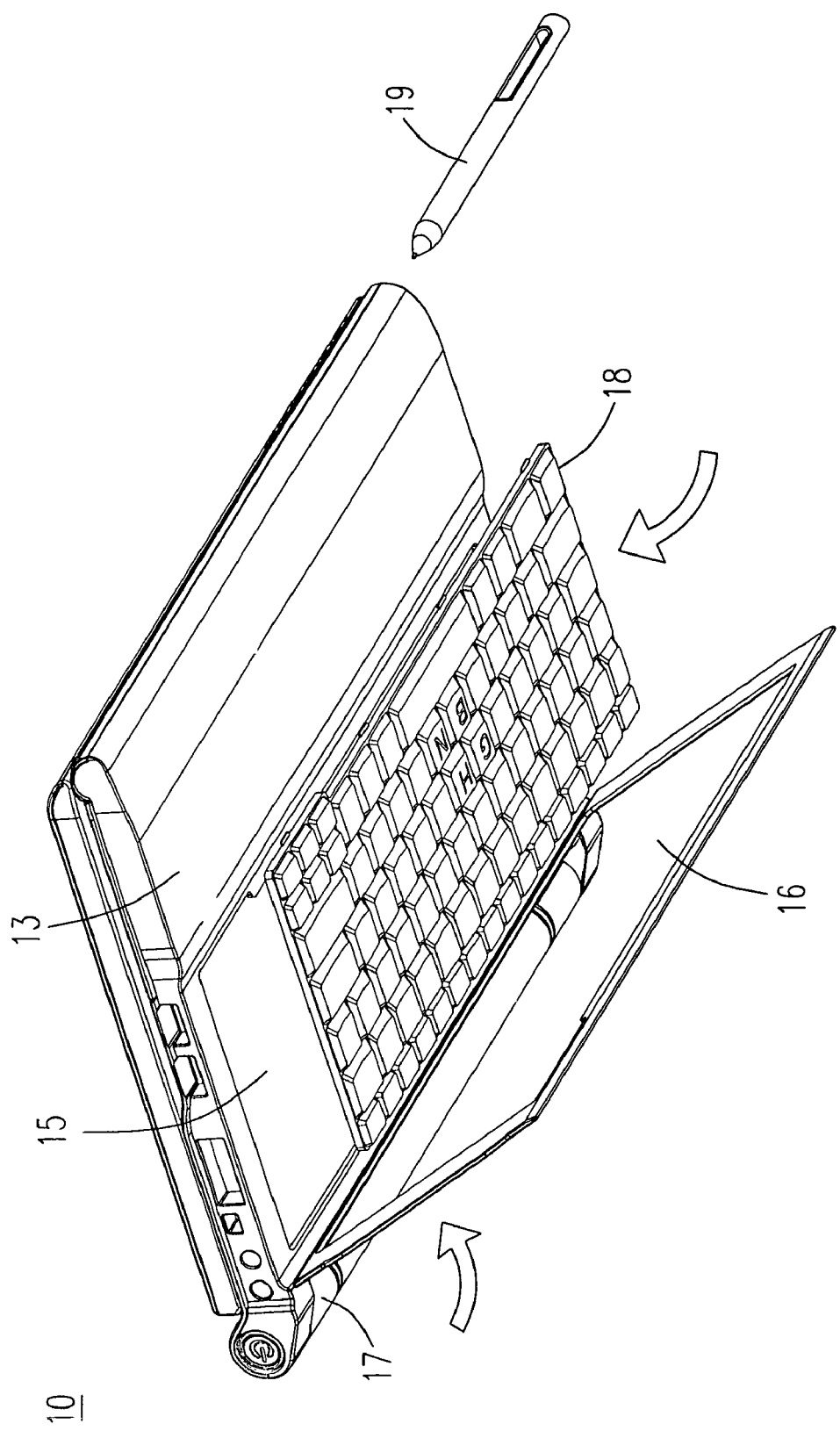
Figure 1F:
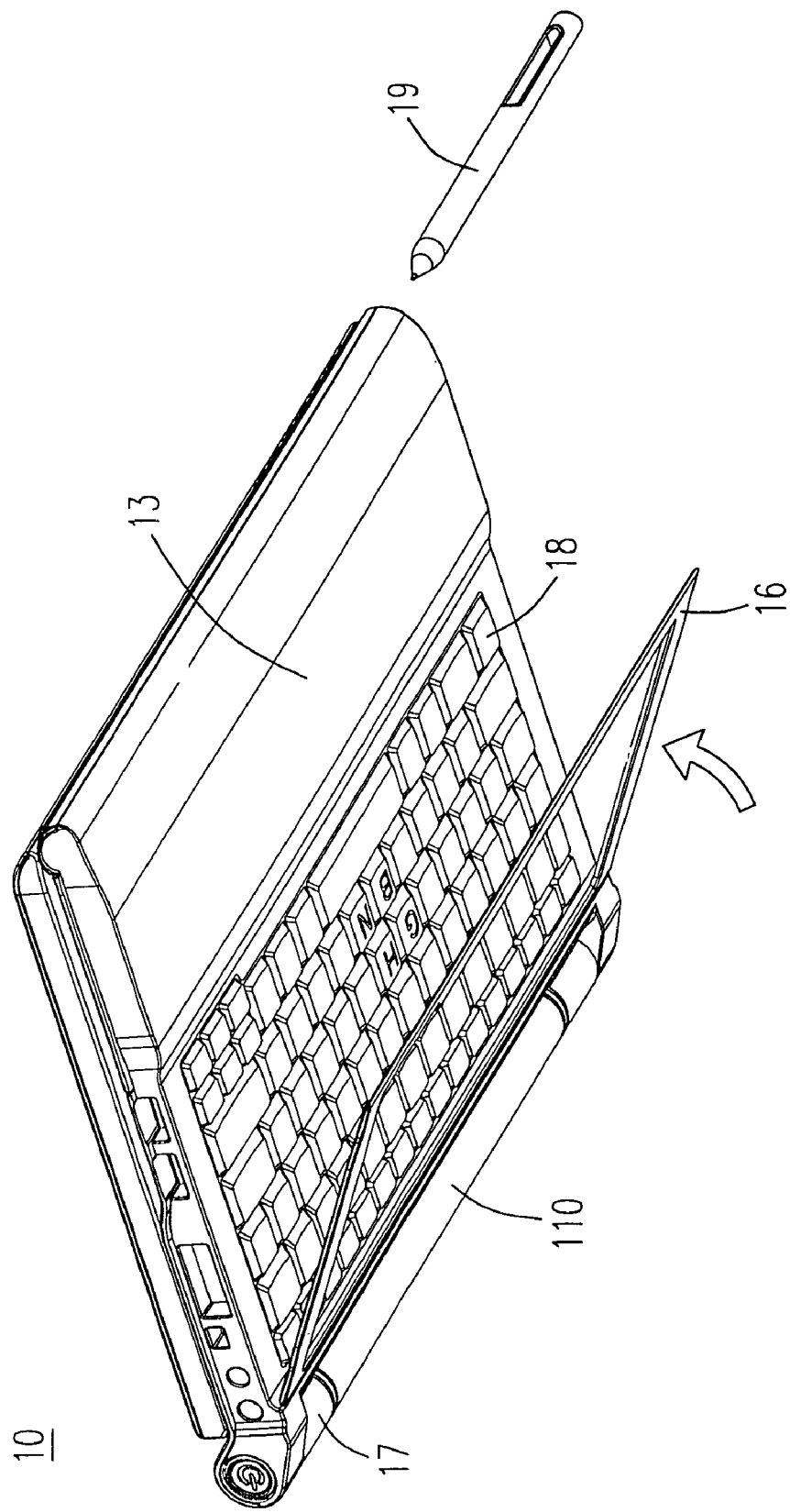
Figure 1G:
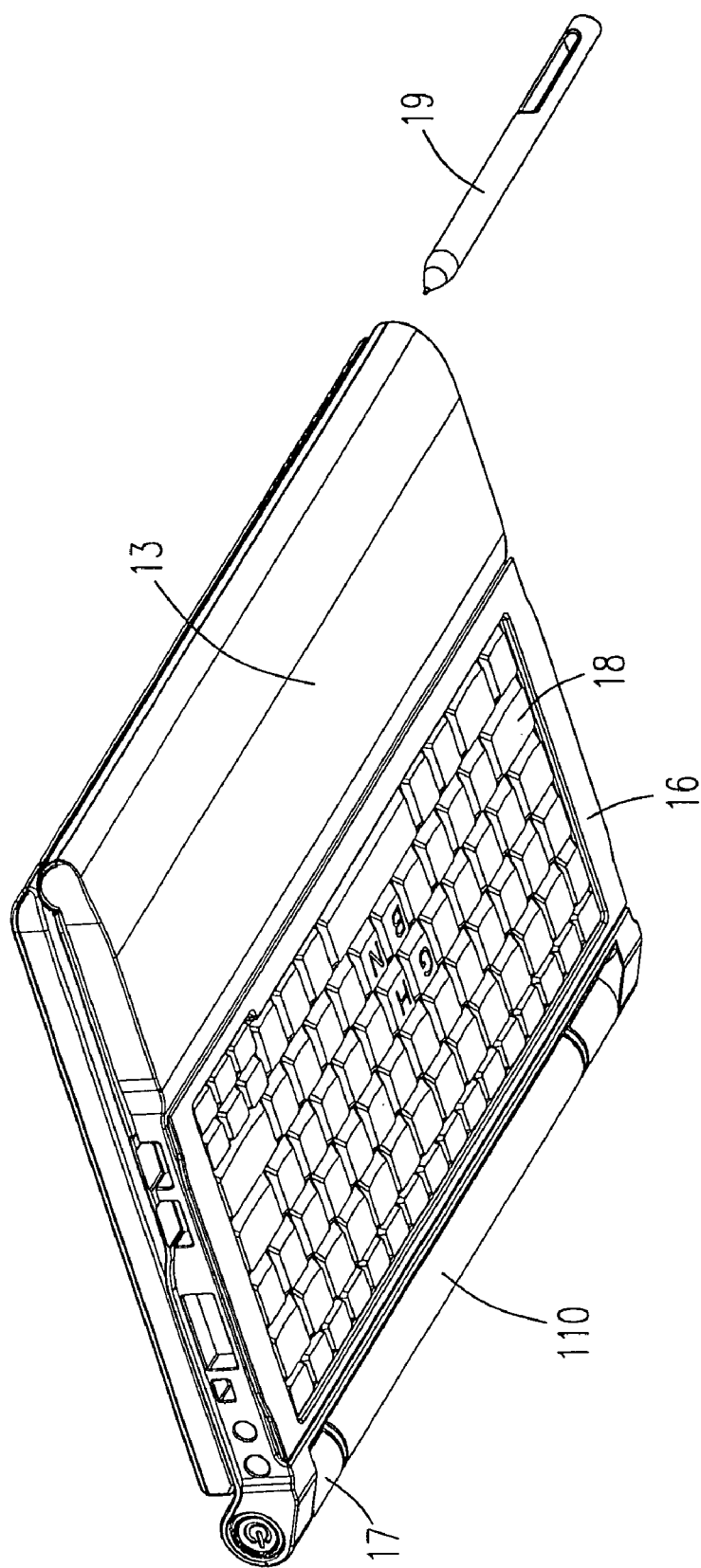
Figure 1H:
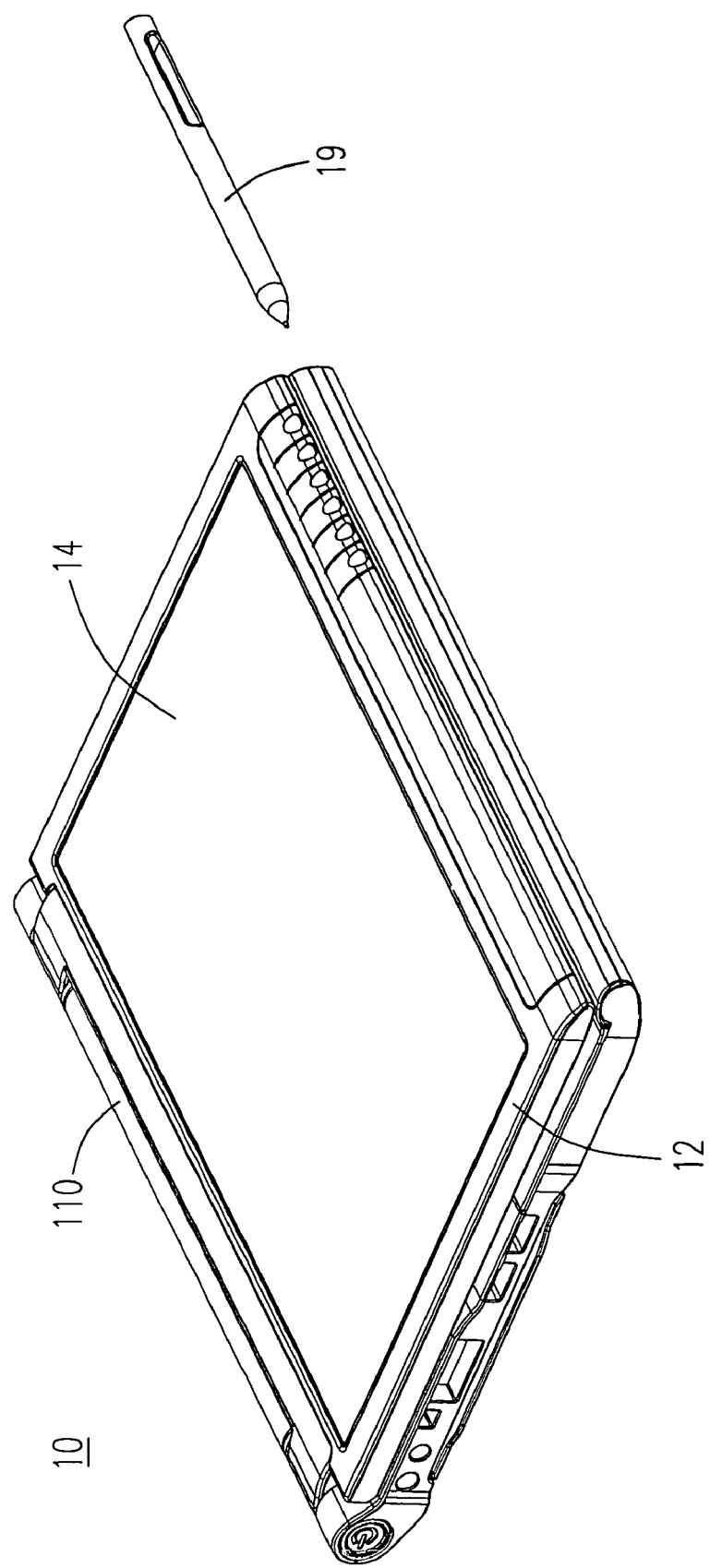
Figure 1I:
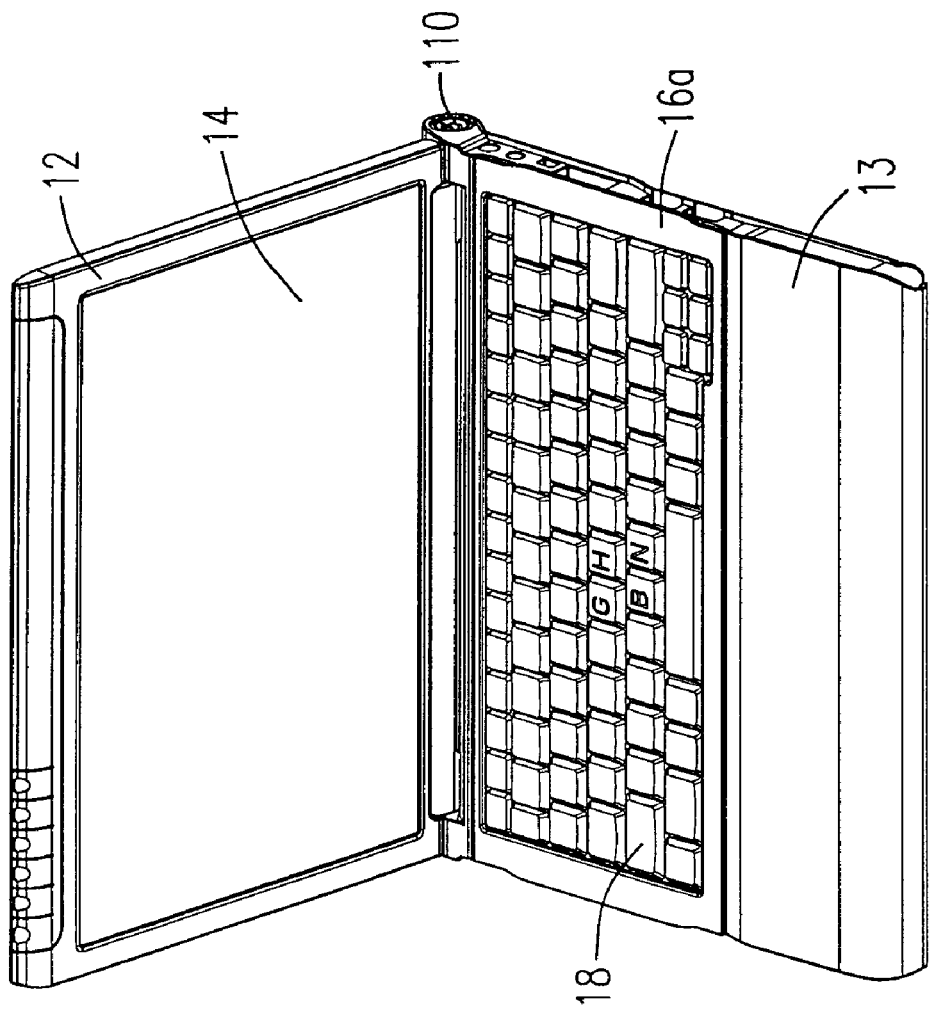

Please simultaneously refer to FIG. 1(*a*) and FIG. 1(*b*), which are respectively the first and the second schematic diagrams illustrating the present invented tablet computer. The tablet computer 10 includes: a electronic calculator 11, a first side 12, a second side 13, a liquid crystal touching display 14, a containing space 15, a cover 16, a pivot 17, a keyboard 18, a pen-shape object 19 and a battery 110, wherein the appearance of the electronic calculator 11 having the first side 12 and the second side 13 is slate-shaped and the first side 12 thereon is opposite to the second side 13 thereon. The liquid crystal touching display 14 is disposed on the first side 12, whereby it is pivotally linked to the electronic calculator 11 via the pivot 17. It is assumed that a cylindrical coordinate system is adopted and the pivot 17 is regarded as the axial direction. The liquid crystal touching display 14 performs the rotation over at least 270° degrees along the circumferential direction in the basis of the predefined axis. The containing space 15 is disposed on the second side 13 whose dimension is at least able to contain the keyboard 18. The cover 16 is pivotally linked to the second side 13 via the pivot 17. The keyboard 18 is detached from the electronic calculator 11 but electrically communicates with the electronic calculator 11 via the wireless transmission manner. One of the usages for the cover 16 is used for rigidly keeping the keyboard fixed in the containing space 15.

For the disclosed structure above-described, the rim portion 16*a* of the cover 16 is the metal-made material, plastic-made material or other rigid material that is at least able to well uphold the weights of the tablet computer 10 and is harmonic with the art style of the tablet computer 10. The central portion 16*b* of the cover 16 is left as hollow or made of the transparent material. Both the multi-stage adjustable manner or the adjustable manner are able to be cooperated with the pivot 17 to perform the rotation. The pen-shape object 19 is a stylus or a digital pen.

Please keep referring to FIG. 1(*c*), which is the schematic diagram illustrating the tablet computer entering the cooperation status the keyboard and the stylus are involved. Once a user intends to operate the tablet computer 10 with the keyboard 18, the user removes the keyboard 18 out of from the containing space 15 which keyboard 18 is originally contained/placed therein. The steps are simply analyzed as follows: opening the cover 16 so as to release the fixing adding to the keyboard 18 by the cover 16 and then removing the keyboard 18 out of from the containing space 15.

Please keep referring to FIG. 1(*d*), which is the schematic diagram illustrating the tablet computer being in the cooperation status the keyboard and the stylus are involved. After the user moves the keyboard 18 out of the containing space 15, the user can dominate the cover 16 to stay in an appropriate angle and thus the cover 16 is transformed to be a supporter to well uphold the electronic calculator 11, so that the user can watch or utilize the liquid crystal touching display 14 with a selected comfortable posture. This supporting function provided by the cover 16 achieves the unanticipated effect to facilitate the practice convenience for users while using the tablet computer 10. For status in use, since the keyboard 18 (not shown in the Figure) wirelessly communicates with the electronic calculator 11, the user can still operate the electronic calculator 11 with the keyboard 18, so as to input data and to further perform the relevant operations. Certainly, the user can directly dominate the tablet computer 10 by the pen-shape object 19 via the liquid crystal touching display 14.

Please keep referring to FIG. 1(*e*), which is a schematic diagram illustrating the containing process (A) for the invented tablet computer. When the user is going to end the operation by the keyboard 18, the user can place the keyboard 18 into the containing space 15 disposed on the tablet computer 10 and adopt other manners to dominate the tablet computer 10. The steps are simply analyzed as follows: moving the keyboard 18 into the containing space 15. It is particularly highlighted that the keyboard 18 is in the upside-down status which proposes to avoid the palm of hand from touching the keys on the keyboard 18, but nevertheless, the keyboard 18 is also allowed to be placed in the containing space 15 in the non-upside-down status (not shown in the Figure). Then the keyboard 18 is fixed in the containing space 15 by the fixation of the cover 16, so that the keyboard 18 is contained/placed in the containing space 15. Based upon this clever room arrangement, the effect to contain/place the keyboard 18 in the containing space 15 is achieved. The FIG. 1(*f*) is a schematic diagram illustrating the containing process (B) for the invented tablet computer and the FIG. 1(*g*) is a schematic diagram illustrating the contained keyboard for the invented tablet computer.

Please keep referring to FIG. 1(*h*), which is the schematic diagram illustrating the tablet computer being in the status the stylus is solely involved. After the keyboard 18 is contained/placed in the containing space 15, the operation mode of the tablet computer 10 is switched to the handwriting-able manner. The user can directly dominate the tablet computer 10 by the pen-shape object 19 via the liquid crystal touching display 14.

Please keep referring to FIG. 1(*i*), which is the schematic diagram illustrating the tablet computer being in the status the keyboard is solely involved. After the keyboard 18 is contained/placed in the containing space 15 in the upside-down status, the user can then rotate the liquid crystal touching display 14 from the first side 12 to the second side 13 and overturn the entire body of the tablet computer 10, so as to enter the status demonstrated in the FIG. 1(*i*). In this period, the user is actually operating an ordinary notebook computer transformed from the present invented tablet computer.

The present invention beats the advantageous as follows: (1) users are allowed to input data with diverse data inputting manners (including at least the handwriting-able manner, the keyboard inputting manner and plus the mouse manner); (2) while the keyboard inputting manner is adopted, users can still arbitrarily select the posture of the tablet computer, which is not conjointly confined by the position of the keyboard; (3) the tablet computer is rigidly upheld by the cover so that the tablet computer is able to alter the different postures thereof and thus the user's varied demands are gratified; (4) even users can dominate the tablet computer by the way as dominating an ordinary notebook computer. The aforementioned advantageous is quite sufficient to facilitate the practice convenience for users while using the invented tablet computer. It is noted that the above-disclosed structure is able to be applied to such as the notebook computer, tablet computer or miscellaneous handheld calculators (e.g. PDA) etc.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims that are to be accorded with the broadest interpretation, so as to encompass all such modifications and similar structures. Accordingly, the invention is not limited by the disclosure, but instead its scope is to be determined entirely by reference to the following claims.

What is claimed is:

1. A computing device, comprising:
an electronic computing base having a first side and a second side opposite to the first side;
a container defined by a recess disposed on the second side of the electronic computing base;
a liquid crystal display pivotally connected to the electronic computing base about a pivot axis;
a keyboard detachedly contained in the container and wirelessly communicating with the electronic computing base; and
a cover for fixing the keyboard in the container, the cover pivotally connected to the second side of the electronic computing base about the pivot axis, wherein the cover has a rim portion, the rim portion configured to fix the keyboard in the container when the cover is closed by contacting an edge portion of the keyboard outside a central portion of the keyboard defined by keys of the keyboard.

2. The computing device according to claim 1, wherein the electronic computing base is supported by the cover.

3. The tablet computer according to claim 1, wherein the rim portion of the cover is made of metal or plastic.

4. The computing device according to claim 1, wherein the electronic computing base and the liquid crystal display are pivotally connected by one of a multi-stage adjustable pivot and an adjustable pivot.

5. The computing device according to claim 1, wherein the keyboard is configured to be fixed in the container by the cover in an input position with the keys disposed through an opening in the central portion of the cover or a flipped position with the keys facing the inside of the container.

6. The computing device of claim 1, wherein the central portion of the cover includes an opening defined in the cover that allows the keys of the keyboard to be accessed and used when the keyboard is fixed in the container by the cover.

7. The computing device of claim 1, wherein the liquid crystal display is a touch-screen liquid crystal display.

8. The computing device of claim 1, wherein the liquid crystal display rotates around the pivot axis relative to the electronic computing base by more than 270 degrees.

9. The computing device of claim 1, wherein the electronic computing base and the liquid crystal display, when the liquid crystal display is rotated around the pivot axis relative to the electronic computing base in a first position, form a slate-shaped tablet computer configuration with the liquid crystal display at a top side of the tablet computer and the second side of the electronic computing base at a bottom side of the tablet computer.

10. The computing device of claim 9, wherein the electronic computing base and the liquid crystal display, when the liquid crystal display is rotated around the pivot axis in a second position, form a notebook computer configuration with the liquid crystal display facing the second side of the electronic computing base.

11. The computing device of claim 10, wherein the pivot is a multi-stage adjustable pivot, and wherein the computing device, when the liquid crystal display is in the second position, operates as a normal notebook computer.

12. The computing device of claim 11, wherein the multi-stage adjustable pivot supports the liquid crystal display when the liquid crystal display is in the second position.

13. A portable computer, comprising:
an electronic computing device having a first side and a second side opposite to the first side;
a display device pivotally mounted to the electronic computing device about a pivot axis;
a container defined by a recess disposed on the second side of the electronic computing device;
an input unit detachedly contained in the container that wirelessly communicates with the electronic computing device; and
a cover that fixes the input unit in the container by a peripheral edge of the input unit, the cover pivotally connected to the second side of the electronic computing device about the pivot axis, wherein the cover has an opening defined therein to allow the input unit to be accessed and used when the cover is closed.

14. A computing device, comprising:
a body having a first side and a second side opposite to the first side;
a container defined by a recess disposed on the second side of the body;
a liquid crystal display pivotally connected to the body about a pivot axis, a screen side of the liquid crystal display facing the second side of the body relative to the pivot axis;
a keyboard having a front side and a back side, the keyboard detachedly contained in the container and wirelessly communicating with the computing device, wherein the front side of the keyboard has input keys; and
a cover that selectably fixes the keyboard in the container, the cover having an opening defined therein that allows the keyboard to be fixed in the container by the cover either in a first position having the front side of the keyboard disposed toward the outside of the container or in a second position having the back side of the keyboard disposed toward the outside of the container, the cover pivotally connected to the body about the pivot axis.

15. A computing device, comprising:
a first housing having a first side and a second side opposite to the first side;
a container defined by a recess disposed on the second side of the first housing;
a second housing having a first side and a second side, the second housing having a display screen on the second side, the second housing connected to the first housing by a pivot, wherein the first housing and the second housing form a slate-shaped body in a first configuration with the second side of the first housing forming a bottom of the slate-shaped body and the second side of the second housing forming a top of the slate-shaped body, and wherein the first housing and the second housing form a notebook computer in a second configuration;
a keyboard having a front side and a back side, the keyboard detachedly contained in the container and wirelessly communicating with the computing device, wherein the front side of the keyboard has input keys; and
a cover that fixes the keyboard in the container, the cover having an opening that allows the keyboard to be fixed in the container by the cover in a first position having the front side of the keyboard disposed to the outside of the container such that the keys can be accessed or in a second position having the back side of the keyboard disposed to the outside of the container, the cover pivotally connected to the second side of the first housing at an edge of the cover proximate to the pivot connecting the first and second housings.

* * * * *